United States Patent
Choi et al.

(10) Patent No.: US 10,401,906 B2
(45) Date of Patent: Sep. 3, 2019

(54) COVER WINDOW FOR DISPLAY DEVICE AND DISPLAY DEVICE INCLUDING THE SAME

(71) Applicant: SAMSUNG DISPLAY CO., LTD., Yongin-si, Gyeonggi-do (KR)

(72) Inventors: Min-Hoon Choi, Seoul (KR); Heon Jung Shin, Hwaseong-si (KR); Hye-Jin Oh, Asan-si (KR); Jeoung Sub Lee, Seoul (KR); Bo A Kim, Icheon-si (KR); Sang Hoon Kim, Hwaseong-si (KR); Sang-Il Park, Yongin-si (KR); Hyun Joon Oh, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 14 days.

(21) Appl. No.: 15/632,284

(22) Filed: Jun. 23, 2017

(65) Prior Publication Data

US 2018/0101198 A1    Apr. 12, 2018

(30) Foreign Application Priority Data

Oct. 7, 2016   (KR) .................. 10-2016-0129961

(51) Int. Cl.
*G06F 3/041*     (2006.01)
*G06F 1/16*      (2006.01)
*G02B 1/111*     (2015.01)
*G02B 1/12*      (2006.01)

(52) U.S. Cl.
CPC ............ *G06F 1/1637* (2013.01); *G02B 1/111* (2013.01); *G02B 1/12* (2013.01); *G06F 3/041* (2013.01); *G06F 2200/1633* (2013.01); *G06F 2200/1634* (2013.01)

(58) Field of Classification Search
CPC .............. G06F 1/1637; G06F 3/041; G06F 2200/1634; G06F 2200/1633; G02B 1/111; G02B 1/12
See application file for complete search history.

(56) References Cited

U.S. PATENT DOCUMENTS

| | | | |
|---|---|---|---|
| 2007/0259161 A1* | 11/2007 | Kato | G02B 1/105 428/212 |
| 2007/0285776 A1* | 12/2007 | Nakamura | G02B 1/105 359/487.02 |
| 2012/0019915 A1* | 1/2012 | Yan | B32B 33/00 359/586 |

FOREIGN PATENT DOCUMENTS

| | | |
|---|---|---|
| KR | 2003-0030351 | 4/2003 |
| KR | 10-2011-0009784 | 1/2011 |
| KR | 10-1147416 | 5/2012 |
| KR | 10-2012-0057708 | 6/2012 |
| KR | 10-2014-0013785 | 2/2014 |
| KR | 10-2014-0122336 | 10/2014 |
| KR | 10-2015-0125197 | 11/2015 |
| KR | 10-2015-0125202 | 11/2015 |
| KR | 10-2016-0042360 | 4/2016 |

* cited by examiner

*Primary Examiner* — Adam R. Giesy
(74) *Attorney, Agent, or Firm* — Lewis Roca Rothgerber Christie LLP

(57) ABSTRACT

A cover window for a display device includes a first film; a second film on the first film; an adhesive layer between the first film and the second film; a coating layer on the second film; and an inner anti-reflective layer between the first film and the coating layer.

19 Claims, 13 Drawing Sheets

COVER WINDOW FOR DISPLAY DEVICE AND DISPLAY DEVICE INCLUDING THE SAME

CROSS-REFERENCE TO RELATED APPLICATION(S)

This application claims priority to and the benefit of Korean Patent Application No. 10-2016-0129961 filed in the Korean Intellectual Property Office on Oct. 7, 2016, the entire contents of which are incorporated herein by reference.

BACKGROUND

1. Field

The present disclosure relates to a cover window for a display device and a display device including the same.

2. Description of the Related Art

Recently, various mobile electronic apparatuses, such as a portable phone, a navigation device, a digital camera, an electronic book, a portable game console, or various kinds of terminals to which a liquid crystal display device or an organic light emitting diode display device is applied as a display device, have been used.

In a typical display device used in the mobile electronic apparatuses, a cover window that is transparently formed so that a user can see a display unit is provided at a front side of a display panel. Because the cover window is positioned at the outermost side of the display device, the cover window should be strong to external impact so as to protect the display panel and/or the like in the mobile electronic apparatuses.

Moreover, instead of an conventional system where a switch or a keyboard is used as an input device, recently, a structure where a touch panel integrated with a display screen is used has come into wide use, and thus compared to an existing mobile apparatus, in many cases, because a surface of the cover window comes into contact with a finger and/or the like, the cover window may have stronger strength.

Further, recently, research on a flexible display device has been actively conducted, and a cover window applied to such a flexible display device may be formed with a foldable member having flexibility.

However, because the cover window may include several layers for improving the strength and flexibility thereof, interface reflection increases, thus total reflectance may increase.

The above information disclosed in this Background section is only for enhancement of understanding of the background of the described technology and therefore it may contain information that does not form prior art.

SUMMARY

The described technology has been made in an effort to provide a cover window for a display device and a display device including the same that may reduce reflectance.

An exemplary embodiment provides a cover window for a display device, including: a first film; a second film on the first film; an adhesive layer between the first film and the second film; a coating layer on the second film; and an inner anti-reflective layer between the first film and the coating layer.

The inner anti-reflective layer may include at least one of a first inner anti-reflective layer between the first film and the adhesive layer, a second inner anti-reflective layer between the adhesive layer and the second film, and a third inner anti-reflective layer between the second film and the coating layer.

A refractive index of the first inner anti-reflective layer may be between that of the first film and that of the adhesive layer. A refractive index of the second inner anti-reflective layer may be between that of the adhesive layer and that of the second film. A refractive index of the third inner anti-reflective layer may be between that of the second film and that of the coating layer.

The refractive indexes of the first inner anti-reflective layer, the second inner anti-reflective layer, and the third inner anti-reflective layer may each be in a range of about 1.467 to about 1.667.

The cover window for the display device may further include an outer anti-reflective layer on the coating layer.

A refractive index of the outer anti-reflective layer is between that of the coating layer and that of air.

The refractive index of the outer anti-reflective layer may be in a range of about 1.200 to about 1.467.

Thicknesses of the first inner anti-reflective layer, the second inner anti-reflective layer, and the third inner anti-reflective layer may each be in a range of about 0.1 μm to about 2 μm.

The inner anti-reflective layer may include a binder, and the binder may include at least one of silicon, epoxy, acryl, vinyl acetate, a silicon oxide, and an aluminum oxide.

The coating layer may include urethane.

The first film and the second film may each include at least one of polyimide (PI), polyamide-imide (PAI), polyetheretherketone (PEEK), and polyetherimide (PEI).

The adhesive layer may include at least one of ethylene vinyl acetate (EVA), polydimethylsiloxane (PDMS), polyurethane (PU), urethane, acryl, and a silicon-based material.

Another embodiment provides a display device including: a display panel; and a cover window on the display panel, wherein the cover window may include a first film, a second film on the first film, an adhesive layer between the first film and the second film, a coating layer on the second film, and an inner anti-reflective layer between the first film and the coating layer.

The inner anti-reflective layer may include at least one of a first inner anti-reflective layer between the first film and the adhesive layer, a second inner anti-reflective layer between the adhesive layer and the second film, and a third inner anti-reflective layer between the second film and the coating layer.

A refractive index of the first inner anti-reflective layer may be between that of the first film and that of the adhesive layer. A refractive index of the second inner anti-reflective layer may be between that of the adhesive layer and that of the second film. A refractive index of the third inner anti-reflective layer may be between that of the second film and that of the coating layer.

The refractive indexes of the first inner anti-reflective layer, the second inner anti-reflective layer, and the third inner anti-reflective layer may each be in a range of about 1.467 to about 1.667.

The cover window for the display device may further include an outer anti-reflective layer on the coating layer.

A refractive index of the outer anti-reflective layer is between that of the coating layer and that of air.

The refractive index of the outer anti-reflective layer may be in a range of about 1.200 to about 1.467.

Thicknesses of the first inner anti-reflective layer, the second inner anti-reflective layer, and the third inner anti-reflective layer may each be in a range of about 0.1 μm to about 2 μm.

Another embodiment provides a cover window for a display device including: a first film; a second film on the first film; an adhesive layer between the first film and the second film; a coating layer on the second film; and an outer anti-reflective layer on the coating layer.

A refractive index of the outer anti-reflective layer may be between that of the coating layer and that of air.

A refractive index of the outer anti-reflective layer may be in a range of about 1.200 to about 1.467.

The outer anti-reflective layer may include a binder, and the binder may include at least one of silicon, epoxy, acryl, vinyl acetate, a silicon oxide, and an aluminum oxide.

The cover window for the display device may further include an inner anti-reflective layer between the first film and the coating layer, and the inner anti-reflective layer may include at least one of a first inner anti-reflective layer between the first film and the adhesive layer, a second inner anti-reflective layer between the adhesive layer and the second film, and a third inner anti-reflective layer between the second film and the coating layer.

According to an embodiment, it is possible to reduce reflectance of the cover window.

DETAILED DESCRIPTION

Figure 1:
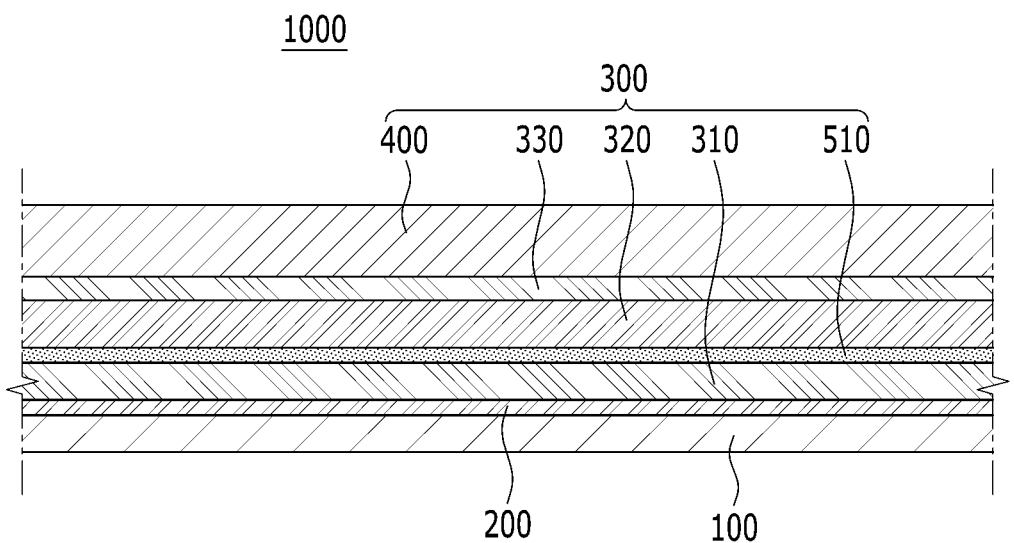
FIG. 1 illustrates a cross-sectional view of a display device according to an exemplary embodiment.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the embodiments of the present invention, portions which do not relate to the description may be omitted, and like reference numerals designate like elements (or components) throughout the specification.

Further, the size and thickness of each component shown in the drawings are arbitrarily shown for better understanding and ease of description, but the present invention is not limited thereto. In the drawings, the thickness of layers, films, panels, regions, etc., may be exaggerated for clarity. For better understanding and ease of description, the thickness of some layers and areas may be exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Spatially relative terms, such as "on," "top," "bottom," "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, "substantially," "about," and similar terms are used as terms of approximation and not as terms of degree, and are intended to account for the inherent deviations in measured or calculated values that would be recognized by those of ordinary skill in the art.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Also, any numerical range recited herein is intended to include all sub-ranges of the same numerical precision subsumed within the recited range. For example, a range of "1.0 to 10.0" or between "1.0 and 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

Throughout the specification, the phrase "on a plane" refers to viewing the object portion from the top, and the phrase "on a cross-section" refers to viewing a cross-section of which the object portion is vertically cut from the side.

A display device according to an exemplary embodiment will be described with reference to FIG. 1.

FIG. 1 illustrates a cross-sectional view of a display device according to an exemplary embodiment.

As shown in FIG. 1, a display device 1000 according to an exemplary embodiment includes a display panel 100 and a cover window 300 positioned on the display panel 100.

The display panel 100 may be flexible, stretchable, foldable, bendable, and/or rollable. The display panel 100 may be bent.

The display panel 100 may be (e.g., may be formed as) an organic light emitting diode display panel. The display panel 100 may include a substrate, a plurality of thin film transistors, a plurality of electrodes disposed on the substrate, and the like. Here, as the substrate is flexible, stretchable, foldable, bendable, and/or rollable, the display panel 100 may be flexible, stretchable, foldable, bendable, and/or rollable.

Although it has been described that the aforementioned display panel 100 is formed as the organic light emitting diode display panel, the present invention is not limited thereto. According to another exemplary embodiment, the display panel 100 may be (e.g., may be formed as) a liquid crystal panel, an electrophoretic display panel, an electrowetting display panel, and/or the like.

An optical layer may be positioned on the display panel 100. Further, the optical layer may be embedded in the display panel 100. The optical layer may include a phase delay layer, a polarization layer, and/or the like.

An adhesive member 200 may include an optical clear adhesive (OCA), an optical clear resin (OCR), a pressure sensitive adhesive (PSA), and/or the like. The adhesive member 200 disposed between the display panel 100 and the cover window 300 serves to adhere the display panel 100 and the cover window 300 to each other.

The cover window 300 may be positioned on the display panel 100 to be adhered to the display panel 100 by the adhesive member 200, and it may serve to protect the display panel 100 against external interference. The cover window 300 includes a first film 310, a second film 330, an adhesive layer 320 positioned between the first film 310 and the second film 330, a coating layer 400 positioned on the second film 330, and a first inner anti-reflective layer 510 positioned between the first film 310 and the coating layer 400.

The first film 310 is positioned on the display panel 100 close to the display panel 100. That is, a distance between the second film 330 and the display panel 100 is larger than a distance between the first film 310 and the display panel 100.

The second film 330 is positioned on the first film 310 close to the coating layer 400. That is, a distance between the first film 310 and the coating layer 400 is larger than a distance between the second film 330 and the coating layer 400.

The first film 310 and the second film 330 may include (e.g., be made of) the same material, or they may include (e.g., be made of) different materials. The first film 310 and the second film 330 may include at least one of polyimide (PI), polyamide-imide (PAI), polyetheretherketone (PEEK), and polyetherimide (PEI).

The adhesive layer 320 is positioned on the first film 310 and the second film 330. The adhesive layer 320 may include (e.g., be made of) an elastic polymer having a modulus that is lower than those of the first film 310 and the second film 330. By reducing stress generated when the display device 1000 is bent or folded through the adhesive layer 320, it is possible to improve a folding characteristic of the display device 1000. Further, because the adhesive layer 320 has resilience, the hardness of the display device 1000 can be improved through a repulsion and restoration characteristic thereof.

The adhesive layer 320 has (e.g., may be formed to have) a film-like shape that may be adhered by a thermal or compression process using ethylene vinyl acetate (EVA), polydimethylsiloxane (PDMS), polyurethane (PU), and/or the like. However, the adhesive layer 320 is not limited thereto, and it may include (e.g., be made of) an optical clear resin or an optical clear adhesive such as urethane, acryl, and a silicon-based material. The adhesive layer 320 may have (e.g., may be formed of) a single material, or two or more kinds of materials.

The first inner anti-reflective layer 510 may be positioned between the first film 310 and the adhesive layer 320. A refractive index of the first inner anti-reflective layer 510 may be between that of the first film 310 and that of the adhesive layer 320. For example, the refractive index of the first film 310 may be about 1.662, and the refractive index of the adhesive layer 320 may be about 1.469. Here, the refractive index of the first inner anti-reflective layer 510 may be in a range of about 1.469 to about 1.662.

The first inner anti-reflective layer 510 may include a binder for connecting materials having a refractive index that is in a range of about 1.4 to about 1.6. The binder may include (e.g., be made of) silicon, epoxy, acryl, vinyl acetate (VA), a silicon oxide (SiOx), an aluminum oxide ($Al_2O_3$), and/or the like.

The coating layer 400 is positioned on the second film 330, and it may include urethane. Particularly, the coating layer 400 may include (e.g., be made of) a self-restorable urethane material. Accordingly, when the display device 1000 is bent or folded and then un-bent or unfolded, the cover window can be restored to its original shape. The coating layer 400 may further include an anti-fingerprint coating layer, an anti-glare (AG) coating layer, and/or the like.

Hereinafter, a thickness of a first inner anti-reflective layer of a cover window of a display device according to an exemplary embodiment will be described with reference to Table 1 and FIG. 2.

Figure 2:
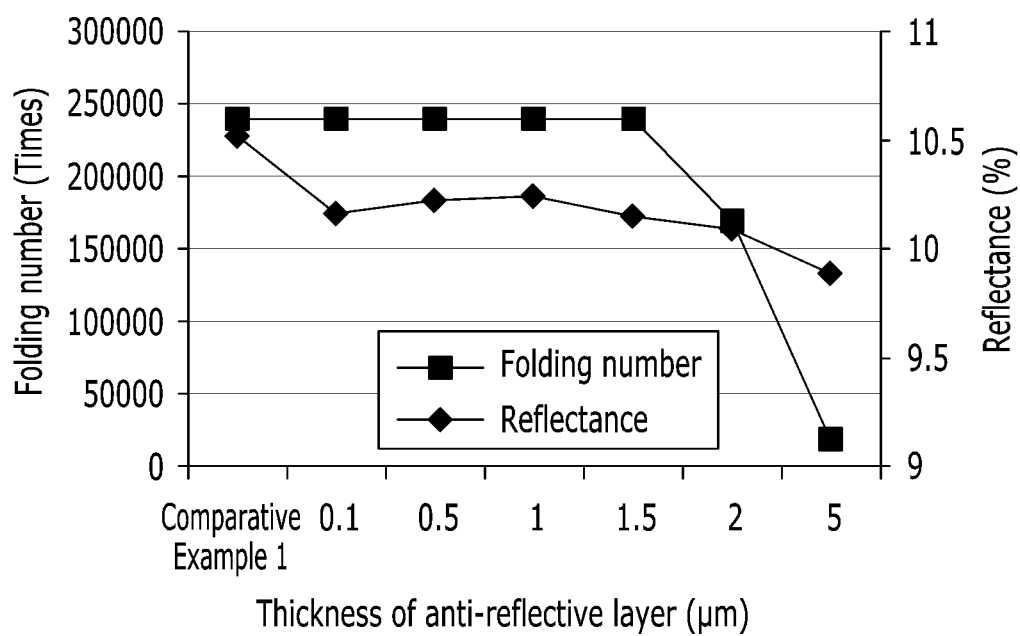
FIG. 2 is a graph of folding numbers and reflectance according to thickness of a first inner anti-reflective layer of a cover window of a display device according to an exemplary embodiment.

FIG. 2 illustrates a graph of folding numbers and reflectance according to thickness of a first inner anti-reflective layer of a cover window of a display device according to an exemplary embodiment.

TABLE 1

|  | Comparative | Thickness of first inner anti-reflective layer (μm) | | | | | |
| --- | --- | --- | --- | --- | --- | --- | --- |
|  | Example 1 | 0.1 | 0.5 | 1.0 | 1.5 | 2.0 | 5.0 |
| Folding number (Times) | 240,000 or more | 240,000 or more | 240,000 or more | 240,000 or more | 240,000 or more | 170,000 | 20,000 |
| Reflectance (%) | 10.52 | 10.16 | 10.22 | 10.24 | 10.15 | 10.09 | 9.89 |

In a case of Comparative Example 1 in which a first inner anti-reflective layer is not included in a cover window thereof, although a bending test of the display device for checking its folding characteristic was performed about 240,000 or more times, no damage occurred to the cover window. When no damage occurred in the bending test of about 240,000 or more times, because the folding characteristic may be determined to be satisfied, the bending test was not further continued. In this case, the reflectance of the cover window of Comparative Example 1 was about 10.52%.

When the thickness of the first inner anti-reflective layer was about 0.1 μm, the folding number for the exemplary embodiment, similar to that of Comparative Example 1, was about 240,000 or more times. In this case, the reflectance of the cover window was about 10.16%, which was lower than that of Comparative Example 1.

When the thickness of the first inner anti-reflective layer was about 0.5 μm, the folding number for the exemplary embodiment, similar to that of Comparative Example 1, was about 240,000 or more times. In this case, the reflectance of the cover window was about 10.22%, which was lower than that of Comparative Example 1.

When the thickness of the first inner anti-reflective layer was about 1.0 μm, the folding number for the exemplary embodiment, similar to that of Comparative Example 1, was about 240,000 or more times. In this case, the reflectance of the cover window was about 10.24%, which was similar to that of when the thickness of the first inner anti-reflective layer was about 0.5 μm.

When the thickness of the first inner anti-reflective layer was about 1.5 μm, the folding number for the exemplary embodiment, similar to that of Comparative Example 1, was about 240,000 or more times. In this case, the reflectance of the cover window was about 10.15%, which was lower than that of when the thickness of the first inner anti-reflective layer was about 0.5 μm and about 1.0 μm.

When the thickness of the first inner anti-reflective layer was about 2.0 μm, the bending test can be performed to the folding number of about 170,000 times. In this case, the reflectance of the cover window was about 10.09%, which was lower than that of when the thickness of the first inner anti-reflective layer was about 1.5 µm.

When the thickness of the first inner anti-reflective layer was about 5.0 µm, the bending test can be performed to the folding number of about 20,000 times. In this case, the reflectance of the cover window was about 9.89%, which is lower than that of when the thickness of the first inner anti-reflective layer was about 2.0 µm.

As shown in Table 1 and FIG. 2, as the thickness of the first inner anti-reflective layer of the cover window of the display device increases (e.g., increases beyond about 1.0 µm), it can be seen that the reflectance thereof generally decreases. In addition, although the folding characteristic thereof is good until the thickness of the first inner anti-reflective layer reaches about 2.0 µm, when the thickness of the first inner anti-reflective layer exceeds about 5.0 µm, the folding characteristic thereof may deteriorate. In a case that only the reflection characteristic is considered, embodiments of the present invention may have the thickness of the first inner anti-reflective layer be greater than about 2.0 µm, but in a case that the folding characteristic is considered, embodiments of the present invention may have the thickness of the first inner anti-reflective layer be equal to or less than about 2.0 µm. In other words, when the folding characteristic and the reflectance of the cover window are considered, embodiments of the present invention may have the thickness of the first inner anti-reflective layer be in a range of about 0.1 µm to about 2.0 µm.

Hereinafter, a display device according to an exemplary embodiment will be described with reference to FIG. 3.

Figure 3:
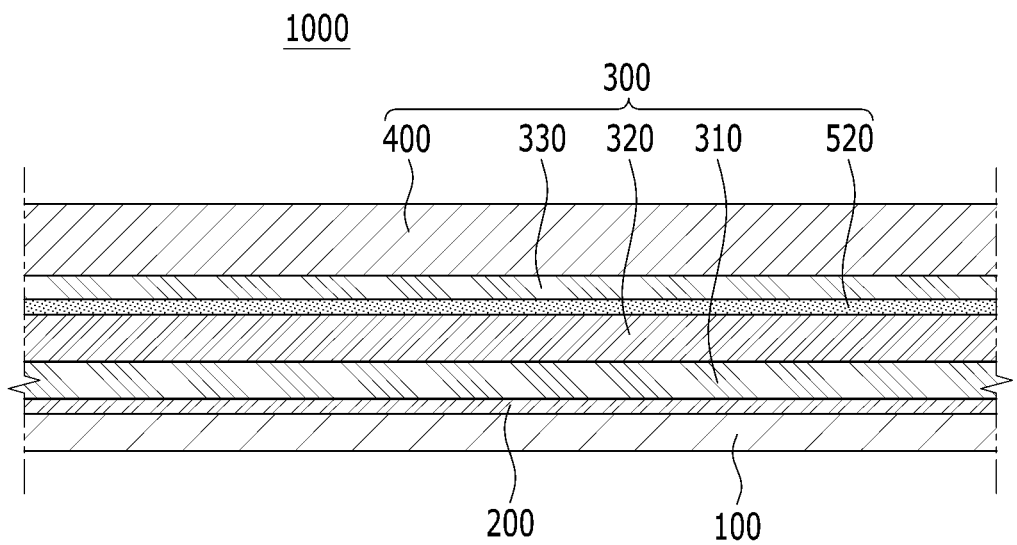
FIG. 3 illustrates a cross-sectional view of a display device according to an exemplary embodiment.

Because many portions of the display device according to the exemplary embodiment of FIG. 3 are the same as those of the display device of FIG. 1, a repeated description thereof may be omitted. The present exemplary embodiment is different from the aforementioned exemplary embodiment in that an inner anti-reflective layer is positioned differently, and this will be described in detail below.

FIG. 3 illustrates a cross-sectional view of a display device according to an exemplary embodiment.

As shown in FIG. 3, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and a second inner anti-reflective layer 520 positioned between the first film 310 and the coating layer 400.

The second inner anti-reflective layer 520 may be positioned between the adhesive layer 320 and the second film 330. A refractive index of the second inner anti-reflective layer 520 may be between that of the adhesive layer 320 and that of the second film 330. For example, the refractive index of the adhesive layer 320 may be about 1.469, and the refractive index of the second film 330 may be about 1.662. In this case, the refractive index of the second inner anti-reflective layer 520 may be in a range of about 1.469 to about 1.662.

The second inner anti-reflective layer 520 may include a binder made of silicon, epoxy, acryl, vinyl acetate (VA), a silicon oxide (SiOx), an aluminum oxide ($Al_2O_3$), and/or the like.

The characteristics associated with the folding number and the reflectance according to the thickness of the second inner anti-reflective layer 520 are similar to those associated with the folding number and the reflectance according to the thickness of the first inner anti-reflective layer of the aforementioned exemplary embodiment. As the thickness of the second inner anti-reflective layer 520 increases (e.g., increases beyond about 1.0 µm), the reflectance thereof may generally decrease. In addition, although the folding characteristic thereof is good until the thickness of the second inner anti-reflective layer 520 reaches about 2.0 µm, when the thickness of the second inner anti-reflective layer 520 exceeds 5.0 µm, the folding characteristic thereof may deteriorate. In a case that only the reflection characteristic is considered, embodiments of the present invention may have the thickness of the second inner anti-reflective layer 520 be greater than about 2.0 µm, but in a case that the folding characteristic is considered, embodiments of the present invention may have the thickness of the second inner anti-reflective layer 520 be equal to or less than about 2.0 µm. In other words, when the folding characteristic and the reflectance of the cover window are considered, in embodiments of the present invention the thickness of the second inner anti-reflective layer 520 may be in a range of about 0.1 µm to about 2.0 µm.

Hereinafter, a display device according to an exemplary embodiment will be described with reference to FIG. 4.

Figure 4:
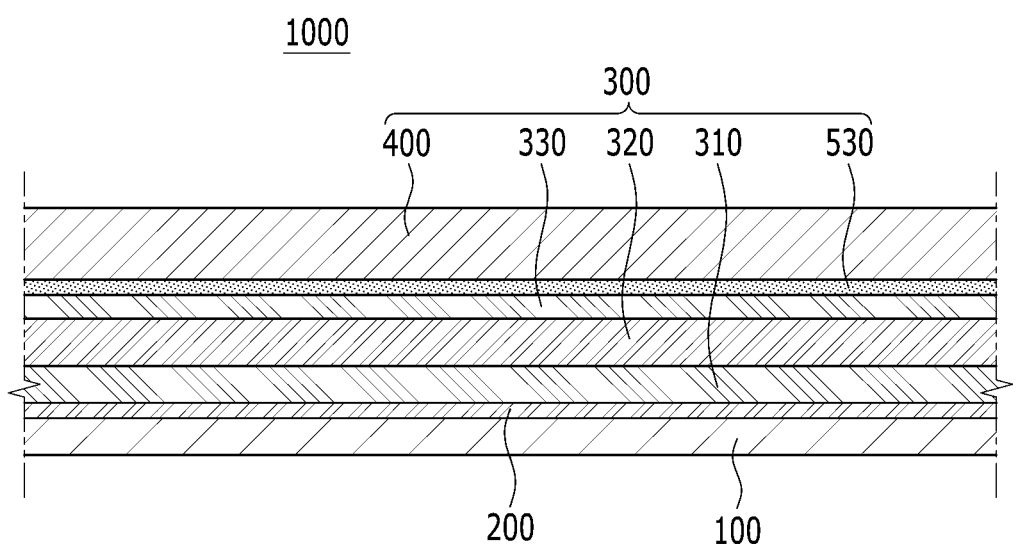
FIG. 4 illustrates a cross-sectional view of a display device according to an exemplary embodiment.

Because many portions of the display device according to the exemplary embodiment of FIG. 4 are the same as those of the display device according to the exemplary embodiment of FIG. 1, a repeated description thereof may be omitted. The present exemplary embodiment is different from the aforementioned exemplary embodiment in that an inner anti-reflective layer is positioned differently, and this will be described in detail below.

FIG. 4 illustrates a cross-sectional view of a display device according to an exemplary embodiment.

As shown in FIG. 4, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and a third inner anti-reflective layer 530 positioned between the first film 310 and the coating layer 400.

The third inner anti-reflective layer 530 may be positioned between the second film 330 and the coating layer 400. A refractive index of the third inner anti-reflective layer 530 may be between that of the second film 330 and that of the coating layer 400. For example, the refractive index of the second film 330 may be about 1.662, and the refractive index of the coating layer 400 may be about 1.499. In this case, the refractive index of the third inner anti-reflective layer 530 may be in a range of about 1.499 to about 1.662.

The third inner anti-reflective layer 530 may include a binder made of silicon, epoxy, acryl, vinyl acetate (VA), a silicon oxide (SiOx), an aluminum oxide ($Al_2O_3$), and/or the like.

The characteristics associated with the folding number and the reflectance according to the thickness of the third inner anti-reflective layer 530 are similar to those associated with the folding number and the reflectance according to the thickness of the first inner anti-reflective layer of the aforementioned exemplary embodiment. As the thickness the third inner anti-reflective layer 530 increases (e.g., increases beyond about 1.0 µm), the reflectance thereof may generally decrease. In addition, although the folding characteristic is good until the thickness of the third inner anti-reflective layer 530 reaches about 2.0 µm, when the thickness of the third inner anti-reflective layer 530 exceeds about 5.0 µm, the folding characteristic thereof may deteriorate. In a case that only reflection characteristic is considered, embodiments of the present invention may have the thickness of the third inner anti-reflective layer 530 be greater than about 2.0 µm, but in a case that the folding characteristic is considered, embodiments of the present invention may have the thickness of the third inner anti-reflective layer 530 be equal to or less than about 2.0 µm. In other words, when the folding characteristic and the reflectance of the cover window are considered, in embodiments of the present invention the thickness of the third inner anti-reflective layer 530 may be in a range of about 0.1 µm to about 2.0 µm.

Hereinafter, a display device according to an exemplary embodiment will be described with reference to FIG. 5.

Figure 5:
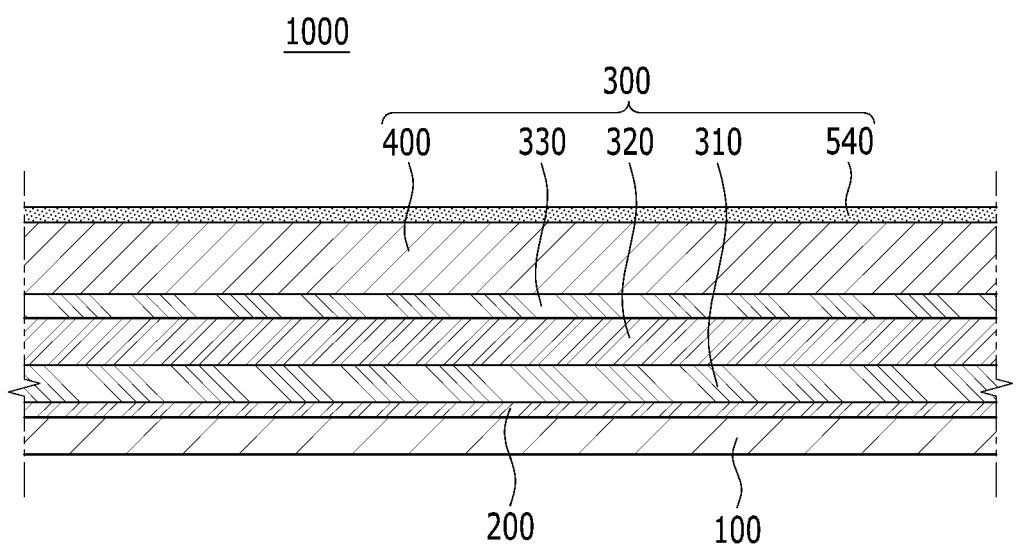
FIG. 5 illustrates a cross-sectional view of a display device according to an exemplary embodiment.

Because many portions of the display device according to the exemplary embodiment of FIG. 5 are the same or substantially the same as those of the display device according to the exemplary embodiment of FIG. 1, a repeated description thereof may be omitted. The present exemplary embodiment is different from the aforementioned exemplary embodiment in that an outer anti-reflective layer is formed instead of the inner anti-reflective layer, and this will be described in detail below.

Hereinafter, a refractive index of an anti-reflective layer of a display device according to an exemplary embodiment will be described with reference to Table 2 and FIG. 6. The anti-reflective layer, in respective exemplary embodiments, refers to the first inner anti-reflective layer, the second inner anti-reflective layer, the third inner anti-reflective layer, and the outer anti-reflective layer.

Figure 6:
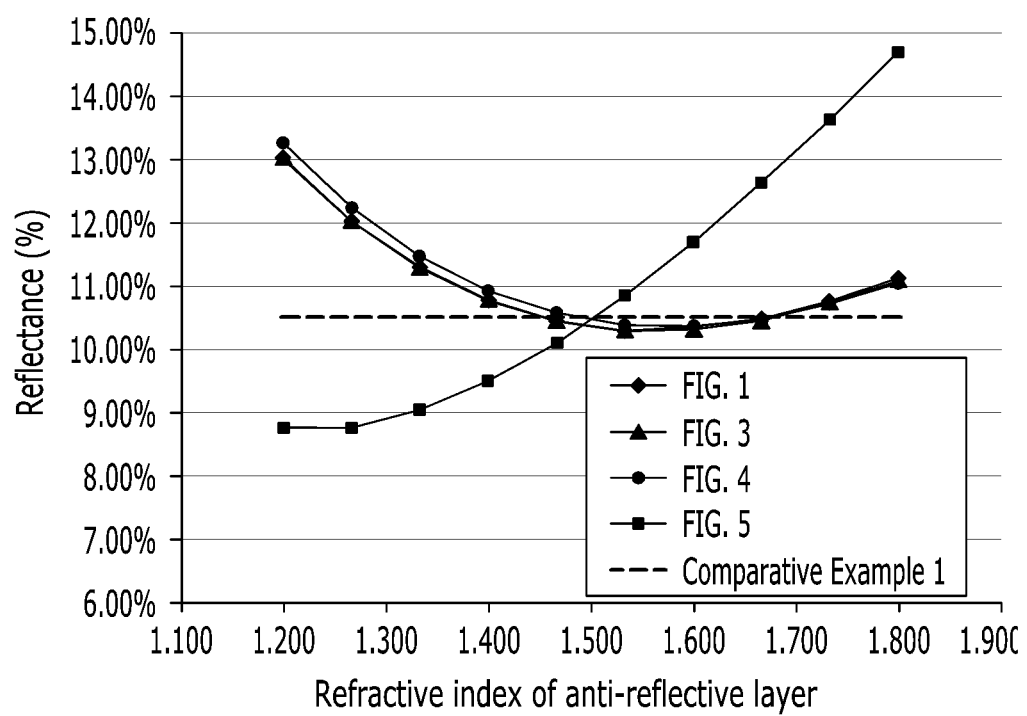
FIG. 6 is a graph of reflectance of a cover window according to refractive indexes of anti-reflective layers of display devices according to respective exemplary embodiments.

FIG. 6 illustrates a graph of reflectance of a cover window according to refractive indexes of anti-reflective layers of display devices according to respective exemplary embodiments. FIG. 6 illustrates the reflectance of the cover window according to the refractive index of the first inner anti-reflective layer of the display device of FIG. 1 and the reflectance of the cover window according to the refractive index of the second inner anti-reflective layer of the display device of FIG. 3. In addition, FIG. 6 illustrates the reflectance of the cover window according to the refractive index of the third inner anti-reflective layer of the display device of FIG. 4 and the reflectance of the cover window according to the refractive index of the outer anti-reflective layer of the display device of FIG. 5. Further, FIG. 6 illustrates Comparative Example 1 corresponding to the reflectance of the cover window in a case that the cover window does not include any of the first inner anti-reflective layer, the second inner anti-reflective layer, the third inner anti-reflective layer, and the outer anti-reflective layer.

TABLE 2

| Refractive index of anti-reflective layer | Reflectance of cover window of FIG. 1 (%) | Reflectance of cover window of FIG. 3 (%) | Reflectance of cover window of FIG. 4 (%) | Reflectance of cover window of FIG. 5 (%) |
|---|---|---|---|---|
| 1.200 | 13.04 | 13.04 | 13.26 | 8.76 |
| 1.267 | 12.04 | 12.05 | 12.24 | 8.79 |
| 1.333 | 11.31 | 11.31 | 11.47 | 9.06 |
| 1.400 | 10.79 | 10.79 | 10.92 | 9.51 |
| 1.467 | 10.47 | 10.47 | 10.57 | 10.12 |
| 1.533 | 10.33 | 10.32 | 10.39 | 10.86 |
| 1.600 | 10.34 | 10.33 | 10.36 | 11.71 |
| 1.667 | 10.49 | 10.47 | 10.47 | 12.64 |
| 1.733 | 10.76 | 10.74 | 10.70 | 13.65 |
| 1.800 | 11.12 | 11.11 | 11.04 | 14.71 |

FIG. 5 illustrates a cross-sectional view of a display device according to an exemplary embodiment.

As shown in FIG. 5, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and an outer anti-reflective layer 540 positioned on the coating layer 400.

The outer anti-reflective layer 540 is positioned on the coating layer 400, and it is positioned at an outermost side of the cover window 300. Accordingly, the outer anti-reflective layer 540 is positioned between the coating layer 400 and an air layer. A refractive index of the outer anti-reflective layer 540 may be between that of the coating layer 400 and that of air. For example, the refractive index of the coating layer 400 may be about 1.499. Because the refractive index of air is about 1, the refractive index of the outer anti-reflective layer 540 may be in a range of about 1 to about 1.499.

The outer anti-reflective layer 540 may include a binder made of silicon, epoxy, acryl, vinyl acetate (VA), a silicon oxide (SiOx), an aluminum oxide ($Al_2O_3$), and/or the like.

The reflectance of the cover window of Comparative Example 1 is about 10.50%.

In the case of the cover window of FIG. 1, when the refractive index of the first inner anti-reflective layer is in a range of about 1.200 to about 1.533, as the refractive index of the first inner anti-reflective layer increases, the reflectance of the cover window gradually decreases. In addition, when the refractive index of the first inner anti-reflective layer is in a range of about 1.533 to about 1.800, as the refractive index of the first inner anti-reflective layer increases, the reflectance of the cover window gradually increases. In the case of the cover window of FIG. 1, when the refractive index of the first inner anti-reflective layer is in a range of about 1.467 to about 1.667, it can be seen that the reflectance of the cover window is lower than that of Comparative Example 1. Particularly, when the refractive index of the first inner anti-reflective layer is about 1.533, the reflectance of the cover window is lowest. When it is considered that an error range is about 0.05, embodiments of the present invention may have the refractive index of the first inner anti-reflective layer be in a range of about 1.483 to about 1.583.

In the case of the cover window of FIG. 3, when the refractive index of the second inner anti-reflective layer is in a range of about 1.200 to about 1.533, as the refractive index of the second inner anti-reflective layer increases, the reflectance of the cover window gradually decreases. In addition, when the refractive index of the second inner anti-reflective layer is in a range of about 1.533 to about 1.800, as the refractive index of the second inner anti-reflective layer increases, the reflectance of the cover window gradually increases. In the case of the cover window of FIG. 3, when the refractive index of the second inner anti-reflective layer is in a range of about 1.467 to about 1.667, it can be seen that the reflectance of the cover window is lower than that of Comparative Example 1. Particularly, when the refractive index of the second inner anti-reflective layer is about 1.533, the reflectance of the cover window is lowest. When it is considered that an error range is about 0.05, embodiments of the present invention may have the refractive index of the second inner anti-reflective layer be in a range of about 1.483 to about 1.583.

In the case of the cover window of FIG. 4, when the refractive index of the third inner anti-reflective layer is in a range of about 1.200 to about 1.533, as the refractive index of the third inner anti-reflective layer increases, the reflectance of the cover window gradually decreases. In addition, when the refractive index of the third inner anti-reflective layer is in a range of about 1.533 to about 1.800, as the refractive index of the third inner anti-reflective layer increases, the reflectance of the cover window gradually increases. In the case of the cover window of FIG. 4, when the refractive index of the third inner anti-reflective layer is in a range of about 1.533 to about 1.667, it can be seen that the reflectance of the cover window is lower than that of Comparative Example 1. Particularly, when the refractive index of the third inner anti-reflective layer is about 1.533, the reflectance of the cover window is lowest. When it is considered that an error range is about 0.05, embodiments of the present invention may have the refractive index of the third inner anti-reflective layer be in a range of about 1.483 to about 1.583.

In the case of the cover window of FIG. 1, FIG. 3, and FIG. 4, it can be seen that the curves of the reflectance of the cover windows according to the inner refractive index of the anti-reflective layer are similar to each other. The inner anti-reflective layer refers to the first inner anti-reflective layer, the second inner anti-reflective layer, and the third inner anti-reflective layer of the respective exemplary embodiments. When the inner refractive index of the anti-reflective layer is in a range of about 1.467 to about 1.667, the reflectance of the cover window decreases. Particularly, embodiments of the present invention may have the inner refractive index of the anti-reflective layer be in a range of about 1.483 to about 1.583.

In the case of the cover window of FIG. 5, as the refractive index of the outer anti-reflective layer increases, the reflectance of the cover window gradually increases. Accordingly, embodiments of the present invention may have the outer anti-reflective layer be made of a material with a low refractive index. In the case of the cover window of FIG. 5, when the refractive index of the outer anti-reflective layer is in a range of about 1.200 to about 1.467, it can be seen that the reflectance of the cover window is lower than that of Comparative Example 1.

Hereinafter, a display device according to an exemplary embodiment will be described with reference to FIG. 7.

Figure 7:
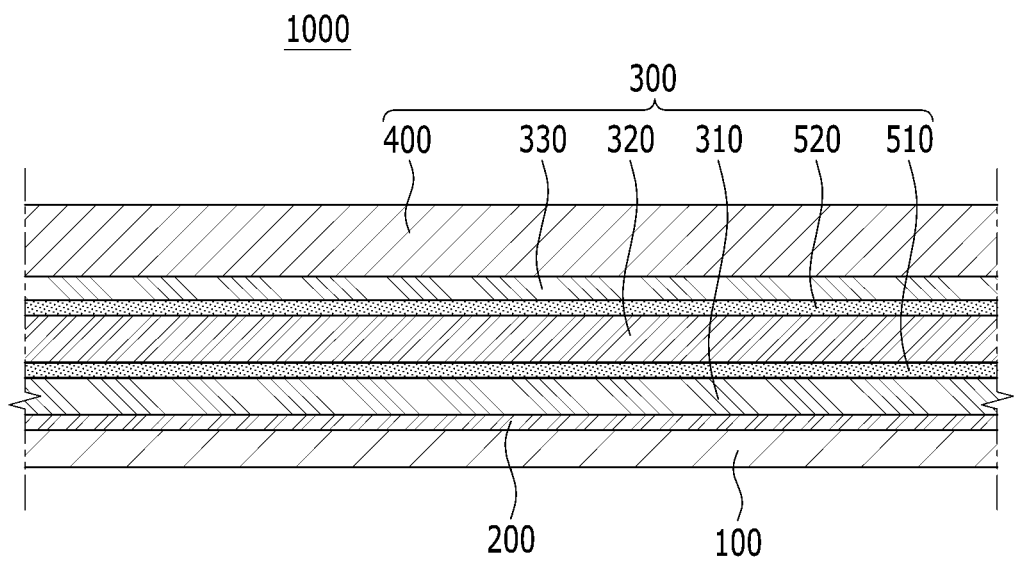
FIG. 7 illustrates a cross-sectional view of a display device according to an exemplary embodiment.

Because many portions of the display device according to the exemplary embodiment of FIG. 7 are the same or substantially the same as those of the display device according to the exemplary embodiment of FIG. 7, a repeated description thereof may be omitted. The present exemplary embodiment is different from the aforementioned exemplary embodiment in that the cover window includes both the first inner anti-reflective layer and the second inner anti-reflective layer, and this will be described in detail below.

FIG. 7 illustrates a cross-sectional view of a display device according to an exemplary embodiment.

As shown in FIG. 7, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and the first inner anti-reflective layer 510 and the second inner anti-reflective layer 520 that are positioned between the first film 310 and the coating layer 400.

The first inner anti-reflective layer 510 may be positioned between the first film 310 and the adhesive layer 320. The refractive index of the first inner anti-reflective layer 510 may be between that of the first film 310 and that of the adhesive layer 320.

The second inner anti-reflective layer 520 may be positioned between the adhesive layer 320 and the second film 330. The refractive index of the second inner anti-reflective layer 520 may be between that of the adhesive layer 320 and that of the second film 330.

The first inner anti-reflective layer 510 and the second inner anti-reflective layer 520 may include a binder made of silicon, epoxy, acryl, vinyl acetate (VA), a silicon oxide (SiOx), an aluminum oxide ($Al_2O_3$), and/or the like.

Respective thicknesses of the first inner anti-reflective layer 510 and the second inner anti-reflective layer 520 may be in a range of about 0.1 μm to about 2.0 μm.

Hereinafter, a display device according to an exemplary embodiment will be described with reference to FIG. 8.

Figure 8:
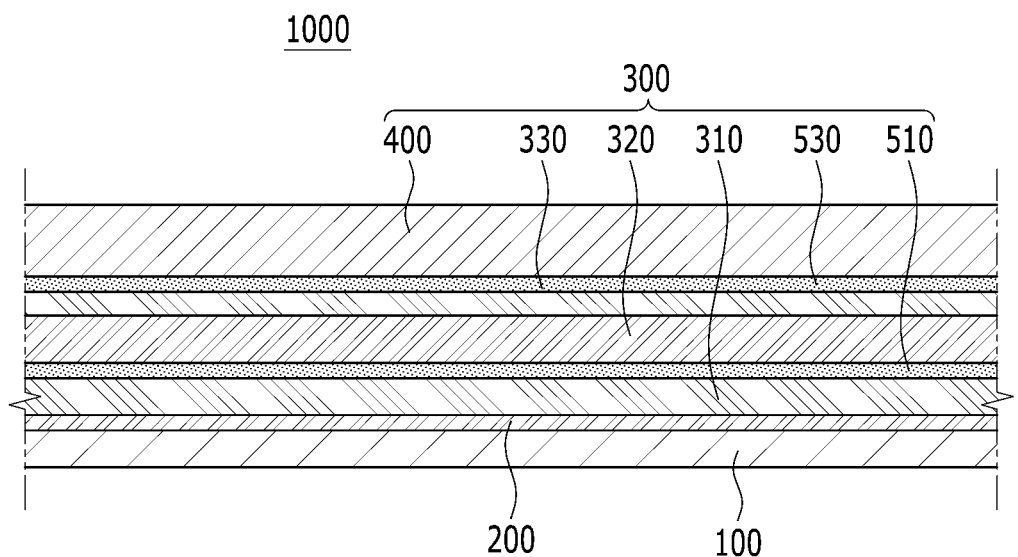
FIG. 8 illustrates a cross-sectional view of a display device according to an exemplary embodiment.

Because many portions of the display device according to the exemplary embodiment of FIG. 8 are the same or substantially the same as those of the display device according to the exemplary embodiment of FIG. 1, a repeated description thereof may be omitted. The present exemplary embodiment is different from the aforementioned exemplary embodiment in that the cover window includes both the first inner anti-reflective layer and the third inner anti-reflective layer, and this will be described in detail below.

FIG. 8 illustrates a cross-sectional view of a display device according to an exemplary embodiment.

As shown in FIG. 8, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and the first inner anti-reflective layer 510 and the third inner anti-reflective layer 530 that are positioned between the first film 310 and the coating layer 400.

The first inner anti-reflective layer 510 may be positioned between the first film 310 and the adhesive layer 320. The refractive index of the first inner anti-reflective layer 510 may be between the refractive index of the first film 310 and the refractive index of the adhesive layer 320.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The first inner anti-reflective layer 510 and the third inner anti-reflective layer 530 may include a binder made of silicon, epoxy, acryl, vinyl acetate (VA), a silicon oxide (SiOx), an aluminum oxide ($Al_2O_3$), and/or the like.

Respective thicknesses of the first inner anti-reflective layer 510 and the third inner anti-reflective layer 530 may be in a range of about 0.1 μm and about 2.0 μm.

Hereinafter, a display device according to an exemplary embodiment will be described with reference to FIG. 9.

Figure 9:
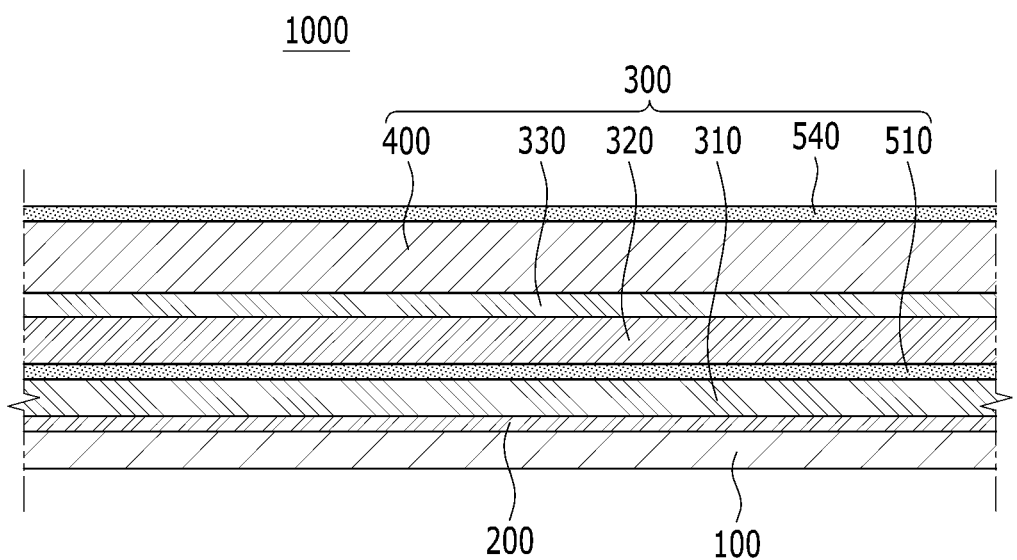
FIG. 9 illustrates a cross-sectional view of a display device according to an exemplary embodiment.

Because many portions of the display device according to the exemplary embodiment of FIG. 9 are the same or substantially the same as those of the display device according to the exemplary embodiment of FIG. 1, a repeated description thereof may be omitted. The present exemplary embodiment is different from the aforementioned exemplary embodiment in that the cover window includes both the first inner anti-reflective layer and the outer anti-reflective layer, and this will be described in detail below.

FIG. 9 illustrates a cross-sectional view of a display device according to an exemplary embodiment.

As shown in FIG. 9, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the first inner anti-reflective layer 510 positioned between the first film 310 and the coating layer 400, and the outer anti-reflective layer 540 positioned on the coating layer 400.

The first inner anti-reflective layer 510 may be positioned between the first film 310 and the adhesive layer 320. The refractive index of the first inner anti-reflective layer 510 may be between the refractive index of the first film 310 and the refractive index of the adhesive layer 320.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The first inner anti-reflective layer 510 and the outer anti-reflective layer 540 may include a binder made of silicon, epoxy, acryl, vinyl acetate (VA), a silicon oxide (SiOx), an aluminum oxide ($Al_2O_3$), and/or the like.

A thickness of the first inner anti-reflective layer 510 may be in a range of about 0.1 μm to about 2.0 μm.

Hereinafter, a display device according to an exemplary embodiment will be described with reference to FIG. 10.

Figure 10:
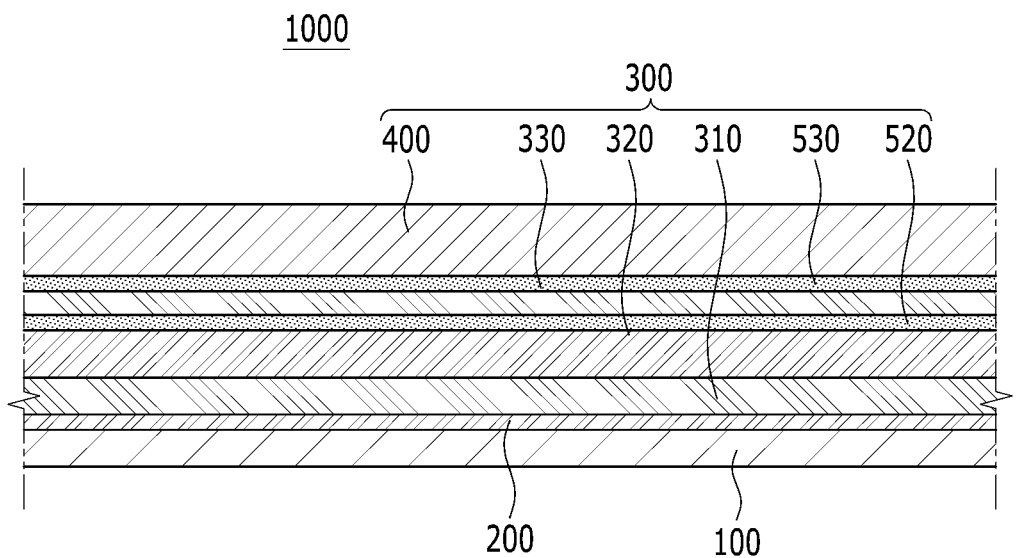
FIG. 10 illustrates a cross-sectional view of a display device according to an exemplary embodiment.

Because many portions of the display device according to the exemplary embodiment of FIG. 10 are the same or substantially the same as those of the display device according to the exemplary embodiment of FIG. 1, a repeated description thereof may be omitted. The present exemplary embodiment is different from the aforementioned exemplary embodiment in that the cover window includes both the second inner anti-reflective layer and the third inner anti-reflective layer, and this will be described in detail below.

FIG. 10 illustrates a cross-sectional view of a display device according to an exemplary embodiment.

As shown in FIG. 10, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and the second inner anti-reflective layer 520 and the third inner anti-reflective layer 530 that are positioned between the first film 310 and the coating layer 400.

The second inner anti-reflective layer 520 may be positioned between the adhesive layer 320 and the second film 330. The refractive index of the second inner anti-reflective layer 520 may be between the refractive index of the adhesive layer 320 and the refractive index of the second film 330.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The second inner anti-reflective layer 520 and the third inner anti-reflective layer 530 may include a binder made of silicon, epoxy, acryl, vinyl acetate (VA), a silicon oxide (SiOx), an aluminum oxide ($Al_2O_3$), and/or the like.

Respective thicknesses of the second inner anti-reflective layer 520 and the third inner anti-reflective layer 530 may be in a range of about 0.1 μm to about 2.0 μm.

Hereinafter, a display device according to an exemplary embodiment will be described with reference to FIG. 11.

Figure 11:
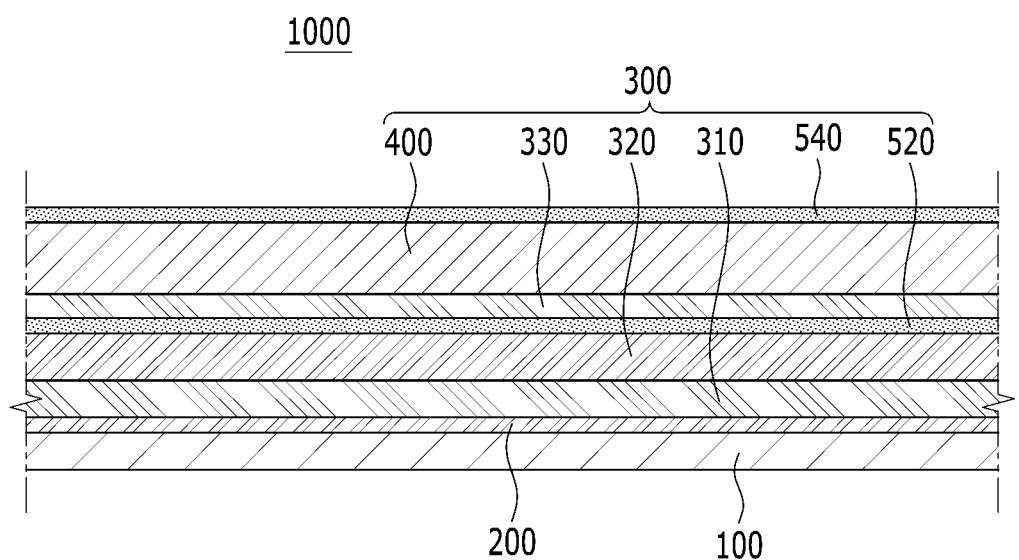
FIG. 11 illustrates a cross-sectional view of a display device according to an exemplary embodiment.

Because many portions of the display device according to the exemplary embodiment of FIG. 11 are the same or substantially the same as those of the display device according to the exemplary embodiment of FIG. 1, a repeated description thereof may be omitted. The present exemplary embodiment is different from the aforementioned exemplary embodiment in that the cover window includes both the second inner anti-reflective layer and the outer anti-reflective layer, and this will be described in detail below.

FIG. 11 illustrates a cross-sectional view of a display device according to an exemplary embodiment.

As shown in FIG. 11, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the second inner anti-reflective layer 520 positioned between the first film 310 and the coating layer 400, and the outer anti-reflective layer 540 positioned on the coating layer 400.

The second inner anti-reflective layer 520 may be positioned between the adhesive layer 320 and the second film 330. The refractive index of the second inner anti-reflective layer 520 may be between the refractive index of the adhesive layer 320 and the refractive index of the second film 330.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The second inner anti-reflective layer 520 and the outer anti-reflective layer 540 may include a binder made of silicon, epoxy, acryl, vinyl acetate (VA), a silicon oxide (SiOx), an aluminum oxide ($Al_2O_3$), and/or the like.

The thickness of the second inner anti-reflective layer 520 may be in a range of about 0.1 μm to about 2.0 μm.

Hereinafter, a display device according to an exemplary embodiment will be described with reference to FIG. 12.

Figure 12:
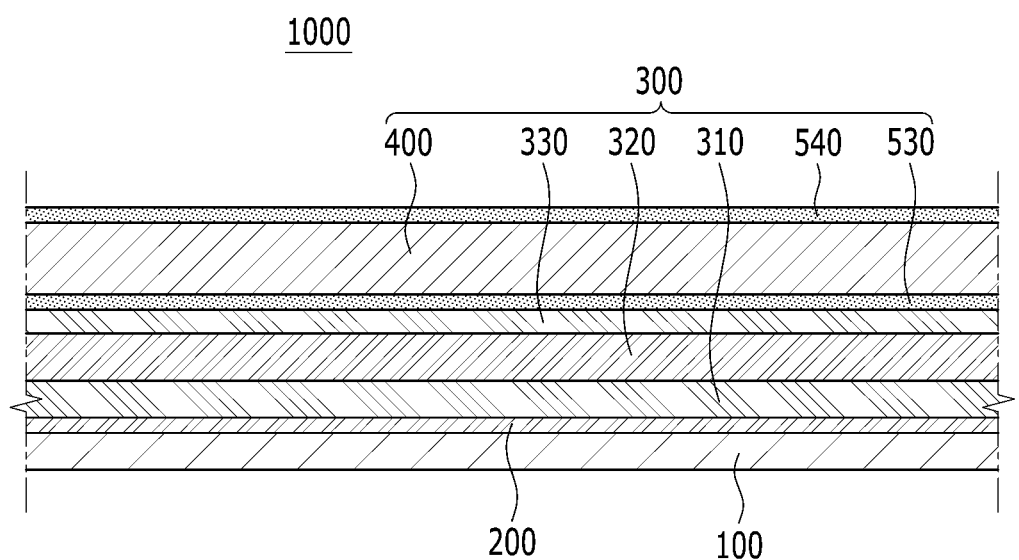
FIG. 12 illustrates a cross-sectional view of a display device according to an exemplary embodiment.

Because many portions of the display device according to the exemplary embodiment of FIG. 12 are the same or substantially the same as those of the display device according to the exemplary embodiment of FIG. 1, a repeated description thereof may be omitted. The present exemplary embodiment is different from the aforementioned exemplary embodiment in that the cover window includes both the third inner anti-reflective layer and the outer anti-reflective layer, and this will be described in detail below.

FIG. 12 illustrates a cross-sectional view of a display device according to an exemplary embodiment.

As shown in FIG. 12, a display device 1000 according to an exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the third inner anti-reflective layer 530 positioned between the first film 310 and the coating layer 400, and the outer anti-reflective layer 540 positioned on the coating layer 400.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The third inner anti-reflective layer 530 and the outer anti-reflective layer 540 may include a binder made of silicon, epoxy, acryl, vinyl acetate (VA), a silicon oxide (SiOx), an aluminum oxide ($Al_2O_3$), and/or the like.

The thickness of the third inner anti-reflective layer 530 may be in a range of about 0.1 μm to about 2.0 μm.

Hereinafter, a display device according to an exemplary embodiment will be described with reference to FIG. 13.

Figure 13:
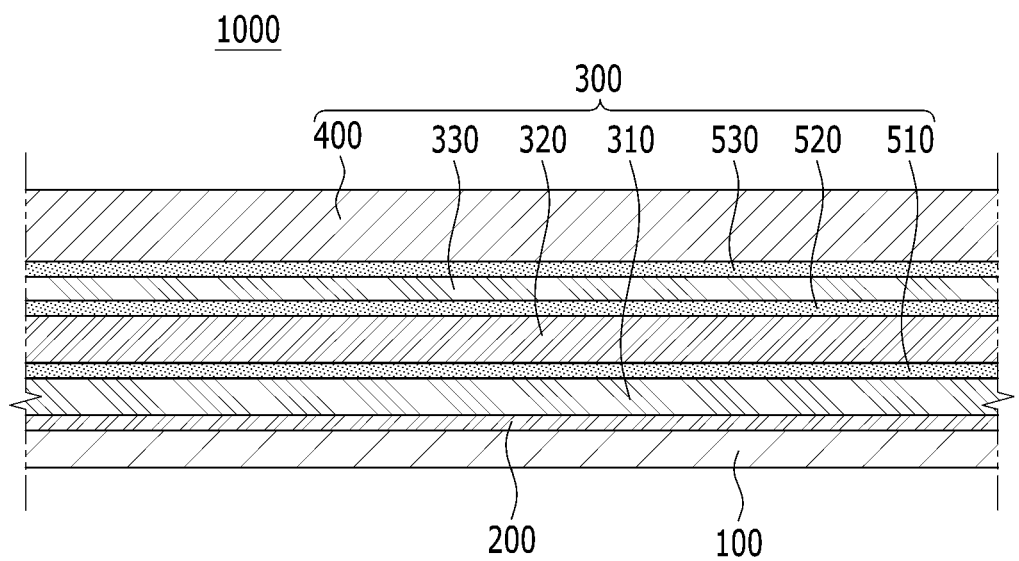
FIG. 13 illustrates a cross-sectional view of a display device according to an exemplary embodiment.

Because many portions of the display device according to the exemplary embodiment of FIG. 13 are the same or substantially the same as those of the display device according to the exemplary embodiment of FIG. 1, a repeated description thereof may be omitted. The present exemplary embodiment is different from the aforementioned exemplary embodiment in that the cover window includes all of the first inner anti-reflective layer, the second inner anti-reflective layer, and the third inner anti-reflective layer, and this will be described in detail below.

FIG. 13 illustrates a cross-sectional view of a display device according to an exemplary embodiment.

As shown in FIG. 13, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, and the first inner anti-reflective layer 510, the second inner anti-reflective layer 520, and the third inner anti-reflective layer 530 that are positioned between the first film 310 and the coating layer 400.

The first inner anti-reflective layer 510 may be positioned between the first film 310 and the adhesive layer 320. The refractive index of the first inner anti-reflective layer 510 may be between the refractive index of the first film 310 and the refractive index of the adhesive layer 320.

The second inner anti-reflective layer 520 may be positioned between the adhesive layer 320 and the second film 330. The refractive index of the second inner anti-reflective layer 520 may be between the refractive index of the adhesive layer 320 and the refractive index of the second film 330.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The first inner anti-reflective layer 510, the second inner anti-reflective layer 520, and the third inner anti-reflective layer 530 may include a binder made of silicon, epoxy, acryl, vinyl acetate (VA), a silicon oxide (SiOx), an aluminum oxide ($Al_2O_3$), and/or the like.

Respective thicknesses of the first inner anti-reflective layer 510, the second inner anti-reflective layer 520, and the third inner anti-reflective layer 530 may be in a range of about 0.1 μm to about 2.0 μm.

Hereinafter, a display device according to an exemplary embodiment will be described with reference to FIG. 14.

Figure 14:
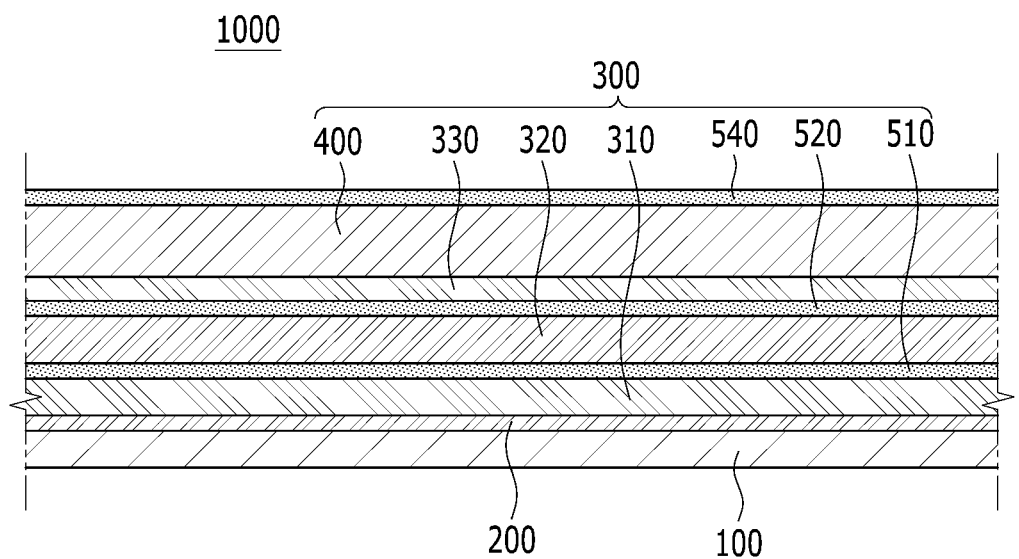
FIG. 14 illustrates a cross-sectional view of a display device according to an exemplary embodiment.

Because many portions of the display device according to the exemplary embodiment of FIG. 14 are the same or substantially the same as those of the display device according to the exemplary embodiment of FIG. 1, a repeated description thereof may be omitted. The present exemplary embodiment is different from the aforementioned exemplary embodiment in that the cover window includes all of the first inner anti-reflective layer, the second inner anti-reflective layer, and the outer anti-reflective layer, and this will be described in detail below.

FIG. 14 illustrates a cross-sectional view of a display device according to an exemplary embodiment.

As shown in FIG. 14, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the first inner anti-reflective layer 510 and the second inner anti-reflective layer 520 positioned between the first film 310 and the coating layer 400, and the outer anti-reflective layer 540 positioned on the coating layer 400.

The first inner anti-reflective layer 510 may be positioned between the first film 310 and the adhesive layer 320. The refractive index of the first inner anti-reflective layer 510 may be between the refractive index of the first film 310 and the refractive index of the adhesive layer 320.

The second inner anti-reflective layer 520 may be positioned between the adhesive layer 320 and the second film 330. The refractive index of the second inner anti-reflective layer 520 may be between the refractive index of the adhesive layer 320 and the refractive index of the second film 330.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The first inner anti-reflective layer 510, the second inner anti-reflective layer 520, and the outer anti-reflective layer 540 may include a binder made of silicon, epoxy, acryl, vinyl acetate (VA), a silicon oxide (SiOx), an aluminum oxide ($Al_2O_3$), and/or the like.

Respective thicknesses of the first inner anti-reflective layer 510 and the second inner anti-reflective layer 520 may be in a range of about 0.1 μm to about 2.0 μm.

Hereinafter, a display device according to an exemplary embodiment will be described with reference to FIG. 15.

Figure 15:
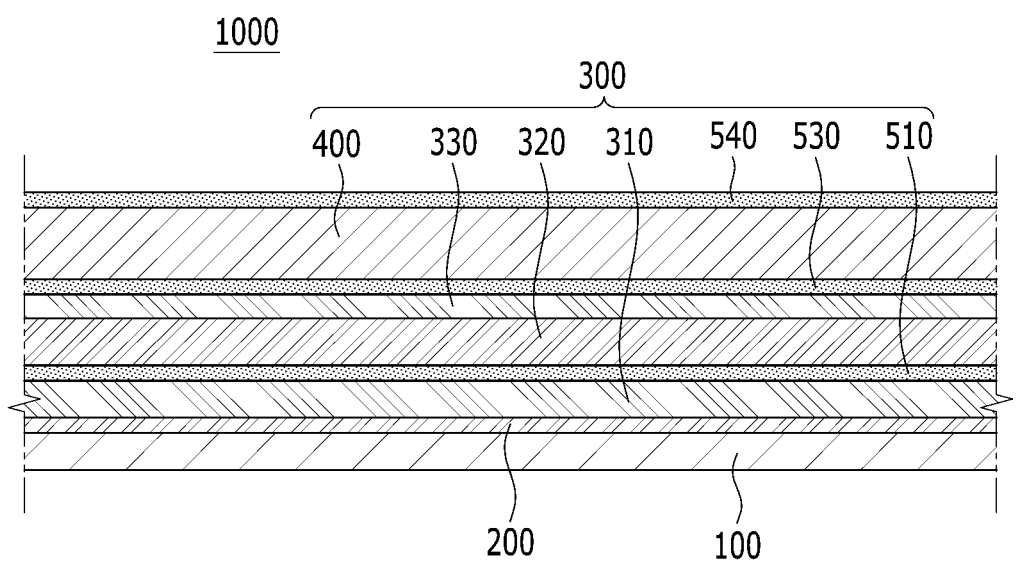
FIG. 15 illustrates a cross-sectional view of a display device according to an exemplary embodiment.

Because many portions of the display device according to the exemplary embodiment of FIG. 15 are the same or substantially the same as those of the display device according to the exemplary embodiment of FIG. 1, a repeated description thereof may be omitted. The present exemplary embodiment is different from the aforementioned exemplary embodiment in that the cover window includes all of the first inner anti-reflective layer, the third inner anti-reflective layer, and the outer anti-reflective layer, and this will be described in detail below.

FIG. 15 illustrates a cross-sectional view of a display device according to an exemplary embodiment.

As shown in FIG. 15, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the first inner anti-reflective layer 510 and the third inner anti-reflective layer 530 positioned between the first film 310 and the coating layer 400, and the outer anti-reflective layer 540 positioned on the coating layer 400.

The first inner anti-reflective layer 510 may be positioned between the first film 310 and the adhesive layer 320. The refractive index of the first inner anti-reflective layer 510 may be between the refractive index of the first film 310 and the refractive index of the adhesive layer 320.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The first inner anti-reflective layer 510, the third inner anti-reflective layer 530, and the outer anti-reflective layer 540 may include a binder made of silicon, epoxy, acryl, vinyl acetate (VA), a silicon oxide (SiOx), an aluminum oxide ($Al_2O_3$), and/or the like.

Respective thicknesses of the first inner anti-reflective layer 510 and the third inner anti-reflective layer 530 may be in a range of about 0.1 μm to about 2.0 μm.

Hereinafter, a display device according to an exemplary embodiment will be described with reference to FIG. 16.

Figure 16:
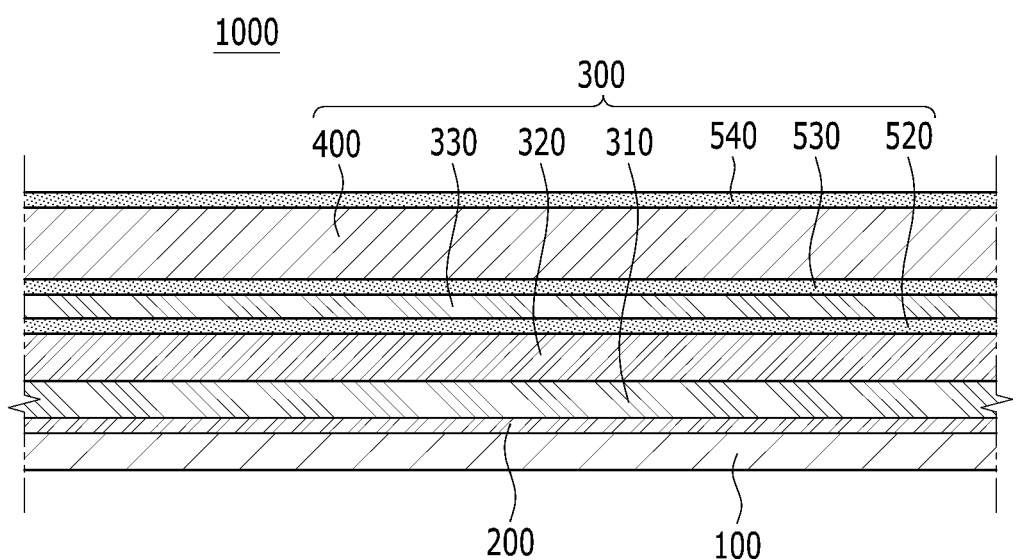
FIG. 16 illustrates a cross-sectional view of a display device according to an exemplary embodiment.

Because many portions of the display device according to the exemplary embodiment of FIG. 16 are the same or substantially the same as those of the display device according to the exemplary embodiment of FIG. 1, a repeated description thereof may be omitted. The present exemplary embodiment is different from the aforementioned exemplary embodiment in that the cover window includes all of the second inner anti-reflective layer, the third inner anti-reflective layer, and the outer anti-reflective layer, and this will be described in detail below.

FIG. 16 illustrates a cross-sectional view of a display device according to an exemplary embodiment.

As shown in FIG. 16, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the second inner anti-reflective layer 520 and the third inner anti-reflective layer 530 positioned between the first film 310 and the coating layer 400, and the outer anti-reflective layer 540 positioned on the coating layer 400.

The second inner anti-reflective layer 520 may be positioned between the adhesive layer 320 and the second film 330. The refractive index of the second inner anti-reflective layer 520 may be between the refractive index of the adhesive layer 320 and the refractive index of the second film 330.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The second inner anti-reflective layer 520, the third inner anti-reflective layer 530, and the outer anti-reflective layer 540 may include a binder made of silicon, epoxy, acryl, vinyl acetate (VA), a silicon oxide (SiOx), an aluminum oxide ($Al_2O_3$), and/or the like.

Respective thicknesses of the second inner anti-reflective layer 520 and the third inner anti-reflective layer 530 may be in a range of about 0.1 μm to about 2.0 μm.

Hereinafter, a display device according to an exemplary embodiment will be described with reference to FIG. 17.

Figure 17:
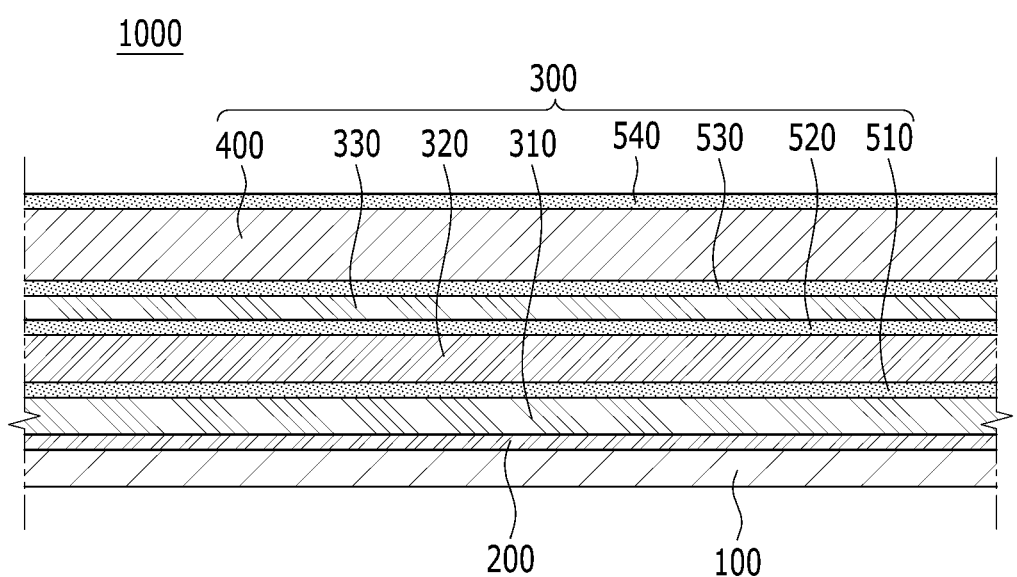
FIG. 17 illustrates a cross-sectional view of a display device according to an exemplary embodiment.

Because many portions of the display device according to the exemplary embodiment of FIG. 17 are the same or substantially the same as those of the display device according to the exemplary embodiment of FIG. 1, a repeated description thereof may be omitted. The present exemplary embodiment is different from the aforementioned exemplary embodiment in that the cover window includes all of the first inner anti-reflective layer, the second inner anti-reflective layer, the third inner anti-reflective layer, and the outer anti-reflective layer, and this will be described in detail below.

FIG. 17 illustrates a cross-sectional view of a display device according to an exemplary embodiment.

As shown in FIG. 17, a display device 1000 according to the exemplary embodiment includes the display panel 100 and the cover window 300 positioned on the display panel 100.

The cover window 300 includes the first film 310, the second film 330, the adhesive layer 320 positioned between the first film 310 and the second film 330, the coating layer 400 positioned on the second film 330, the first inner anti-reflective layer 510, the second inner anti-reflective layer 520, and the third inner anti-reflective layer 530 that are positioned between the first film 310 and the coating layer 400, and the outer anti-reflective layer 540 positioned on the coating layer 400.

The first inner anti-reflective layer 510 may be positioned between the first film 310 and the adhesive layer 320. The refractive index of the first inner anti-reflective layer 510 may be between the refractive index of the first film 310 and the refractive index of the adhesive layer 320.

The second inner anti-reflective layer 520 may be positioned between the adhesive layer 320 and the second film 330. The refractive index of the second inner anti-reflective layer 520 may be between the refractive index of the adhesive layer 320 and the refractive index of the second film 330.

The third inner anti-reflective layer 530 may be positioned between the second film 330 and the coating layer 400. The refractive index of the third inner anti-reflective layer 530 may be between the refractive index of the second film 330 and the refractive index of the coating layer 400.

The outer anti-reflective layer 540 is positioned on the coating layer 400, and it is positioned at an outermost side of the cover window 300. Accordingly, the outer anti-reflective layer 540 is positioned between the coating layer 400 and the air layer. The refractive index of the outer anti-reflective layer 540 may be between the refractive index of the coating layer 400 and the refractive index of air.

The first inner anti-reflective layer 510, the second inner anti-reflective layer 520, the third inner anti-reflective layer 530, and the outer anti-reflective layer 540 may include a binder made of silicon, epoxy, acryl, vinyl acetate (VA), a silicon oxide (SiOx), an aluminum oxide ($Al_2O_3$), and/or the like.

Respective thicknesses of the first inner anti-reflective layer 510, the second inner anti-reflective layer 520, and the third inner anti-reflective layer 530 may be in a range of about 0.1 μm to about 2.0 μm.

Hereinafter, the reflectance of the cover windows of the display devices according to respective exemplary embodiments will be compared and described with reference to FIG. 18 to FIG. 20.

Figure 18:
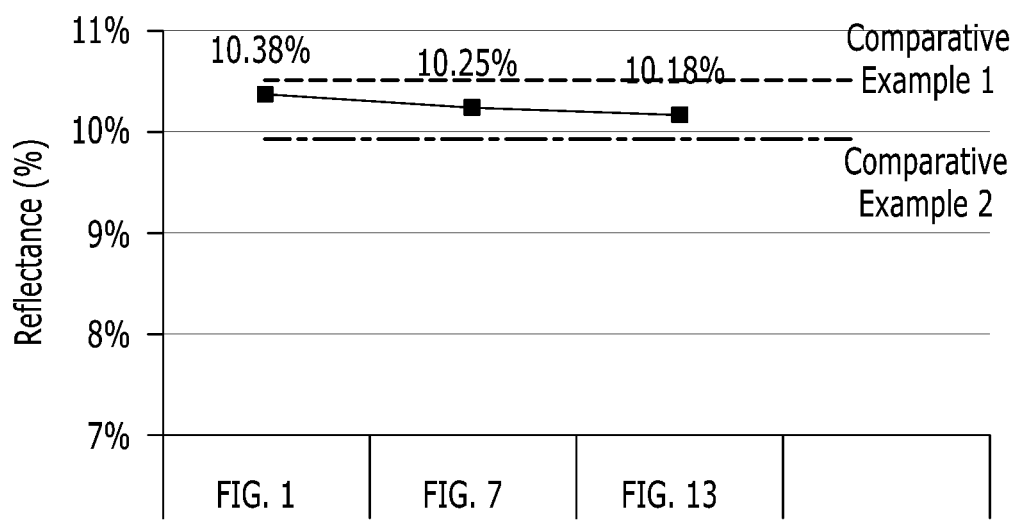
FIG. 18 is a graph of reflectance of cover windows of display devices according to respective exemplary embodiments.
Figure 19:
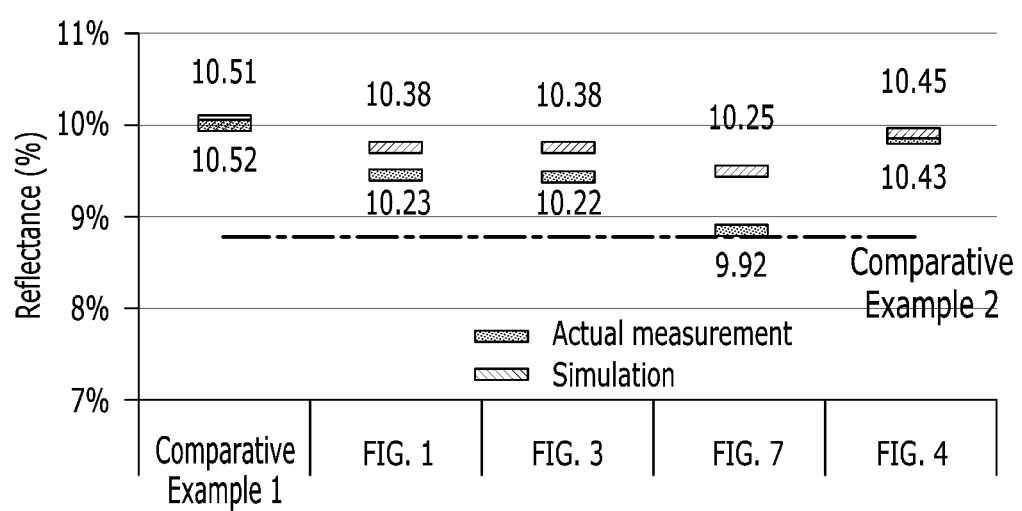
FIG. 19 is a graph of reflectance of cover windows of display devices according to respective exemplary embodiments.
Figure 20:
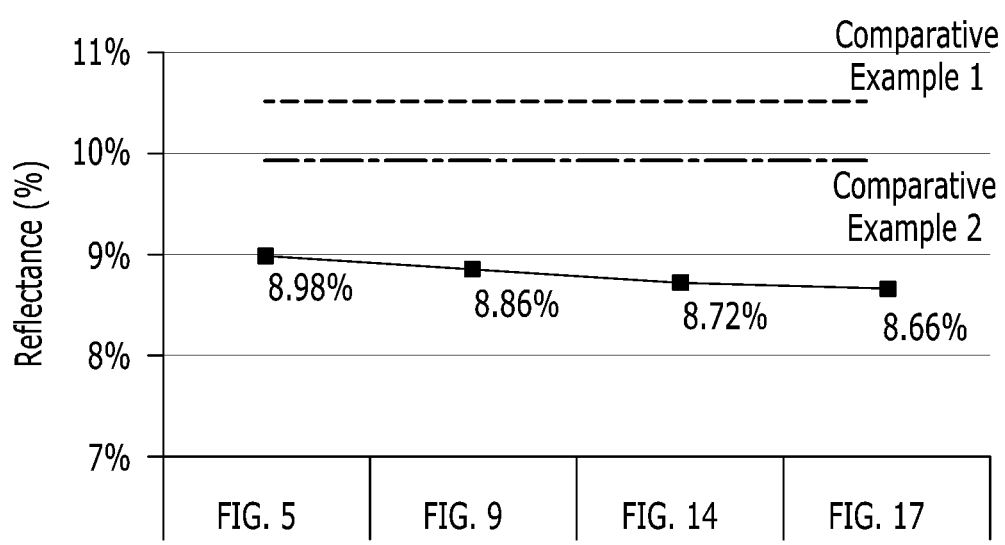
FIG. 20 is a graph of reflectance of cover windows of display devices according to respective exemplary embodiments.

FIGS. 18 to 20 illustrate graphs of reflectance of cover windows of display devices according to respective exemplary embodiments. FIG. 18 and FIG. 20 illustrate data according to a simulation, and FIG. 19 illustrates data according to both a simulation and an actual experiment. Comparative Example 1 corresponds to a case that the cover window does not include the anti-reflective layer such as the first inner anti-reflective layer, the second inner anti-reflective layer, the third inner anti-reflective layer, and the outer anti-reflective layer. Comparative Example 2 corresponds to a case that the cover window includes only one of the first and second films, but does not include the adhesive layer and the anti-reflective layer. That is, Comparative Example 2 refers to a case that the cover window does not include a plurality of films but a single film.

As shown in FIG. 18, the reflectance of the cover window of Comparative Example 1 is about 10.52%, and the reflectance of the cover window of Comparative Example 2 is about 9.93%. The reflectance of the cover window of Comparative Example 1 is higher than that of the cover window of Comparative Example 2. Because the cover window of Comparative Example 2 is formed with a single film, the interface reflection does not substantially occur due to refractive index differences between a plurality of layers. Because the cover window of Comparative Example 1 includes a plurality of films and adhesive layers interposed between the plurality of films, that is, the cover window of Comparative Example 1 includes a plurality of layers, the interface reflection increases due to the refractive index differences between the plurality of layers. That is, because the cover window of Comparative Example 1 has a structure in which a plurality of layers is included, the strength and flexibility of the cover window may increase compared with Comparative Example 2, but the reflectance thereof also increases.

The cover window of FIG. 1 includes the first inner anti-reflective layer. Because the cover window of FIG. 1 further includes one anti-reflective layer in addition to the structure of the cover window of Comparative Example 1, it can be seen that the reflectance of the cover window of FIG. 1 is lower than that of the cover window of Comparative Example 1.

The cover window of FIG. 7 includes the first inner anti-reflective layer and the second inner anti-reflective layer. Because the cover window of FIG. 7 further includes two anti-reflective layers in addition to the structure of the cover window of Comparative Example 1, it can be seen that the reflectance of the cover window of FIG. 7 is lower than those of the cover window of Comparative Example 1 and the cover window of FIG. 1.

The cover window of FIG. 13 includes the first inner anti-reflective layer, the second inner anti-reflective layer, and the third inner anti-reflective layer. Because the cover window of FIG. 13 further includes three anti-reflective layers in addition to the structure of the cover window of Comparative Example 1, it can be seen that the reflectance of the cover window of FIG. 13 is lower than those of the cover windows of Comparative Example 1, FIG. 1, and FIG. 7.

That is, as each of the anti-reflective layers is added between a plurality of layers of the cover window, the reflectance of the cover window decreases.

As shown in FIG. 19, the reflectance of the cover window of Comparative Example 1 is higher than that of the cover window of Comparative Example 2, and the reflectance of the cover window of the exemplary embodiments is lower than that of the cover window of Comparative Example 1.

The cover window of FIG. 1 includes the first inner anti-reflective layer positioned between the first film and the adhesive layer, the cover window of FIG. 3 includes the second inner anti-reflective layer positioned between the adhesive layer and the second film, and the cover window of FIG. 4 includes the third inner anti-reflective layer positioned between the second film and the coating layer. That is, in FIG. 1, FIG. 3, and FIG. 4, the anti-reflective layers are positioned differently from each other. It can be seen that the reflectance greatly decreases in the cover window of FIG. 7 as compared to the cover windows of FIG. 1, FIG. 3, and FIG. 4.

The cover window of FIG. 7 includes the first inner anti-reflective layer and the second inner anti-reflective layer. The reflectance of the cover window of FIG. 7 is lower than those of the cover windows of FIG. 1 and FIG. 3 that include one anti-reflective layer. Referring to data according to the actual experiment, the reflectance of the cover window of FIG. 7 is about 9.92%, and it is lower than that of Comparative Example 2 formed with the single film.

As shown in FIG. 20, it can be seen that the reflectance of the cover windows of FIG. 5, FIG. 9, FIG. 14, and FIG. 17 is lower than those of Comparative Example 1 and the cover window of Comparative Example 2.

The cover windows of FIG. 5, FIG. 9, FIG. 14, and FIG. 17 include the outer anti-reflective layer. The cover window of FIG. 5 includes the outer anti-reflective layer, and the cover window of FIG. 9 includes the first inner anti-reflective layer and the outer anti-reflective layer. The cover window of FIG. 14 includes the first inner anti-reflective layer, the second inner anti-reflective layer, and the outer anti-reflective layer. The cover window of FIG. 17 includes the first inner anti-reflective layer, the second inner anti-reflective layer, the third inner anti-reflective layer, and the outer anti-reflective layer.

It can be seen that the reflectance of the cover window decreases when the cover window includes the inner anti-reflective layer and the outer anti-reflective layer. However, because the outer anti-reflective layer is provided on the coating layer of the cover window, when the coating layer is made of a self-restorable urethane material, a process for forming the outer anti-reflective layer may be difficult. Accordingly, when the coating layer is formed with a hard coating layer, in view of reduction of the reflectance, embodiments of the present invention may have the cover window include both the inner anti-reflective layer and the outer anti-reflective layer. When the coating layer is made of a material such as urethane, for process ease and reflectance reduction, embodiments of the present invention may have a plurality of inner anti-reflective layers.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SOME OF THE REFERENCE NUMERALS

100: display panel
310: first film
320: adhesive layer
330: second film
400: coating layer
510: first inner anti-reflective layer
520: second inner anti-reflective layer
530: third inner anti-reflective layer
540: outer anti-reflective layer

What is claimed is:

1. A cover window for a display device, comprising:
    a first film;
    a second film on the first film;
    an adhesive layer between the first film and the second film;
    a coating layer on the second film;
    an inner anti-reflective layer between the first film and the coating layer; and
    an outer anti-reflective layer on the coating layer, wherein the outer anti-reflective layer is the outermost layer of the cover window.

2. The cover window for the display device of claim 1, wherein the inner anti-reflective layer comprises at least one of:
    a first inner anti-reflective layer between the first film and the adhesive layer;
    a second inner anti-reflective layer between the adhesive layer and the second film; and
    a third inner anti-reflective layer between the second film and the coating layer.

3. The cover window for the display device of claim 2, wherein a refractive index of the first inner anti-reflective layer is between that of the first film and that of the adhesive layer,
    wherein a refractive index of the second inner anti-reflective layer is between that of the adhesive layer and that of the second film, and
    wherein a refractive index of the third inner anti-reflective layer is between that of the second film and that of the coating layer.

4. The cover window for the display device of claim 2, wherein refractive indexes of the first inner anti-reflective layer, the second inner anti-reflective layer, and the third inner anti-reflective layer are each in a range of about 1.467 to about 1.667.

5. The cover window for the display device of claim 2, wherein thicknesses of the first inner anti-reflective layer, the second inner anti-reflective layer, and the third inner anti-reflective layer are each in a range of about 0.1 µm to about 2 µm.

6. The cover window for the display device of claim 1, wherein a refractive index of the outer anti-reflective layer is between that of the coating layer and that of air.

7. The cover window for the display device of claim 1, wherein a refractive index of the outer anti-reflective layer is in a range of about 1.200 to about 1.467.

8. The cover window for the display device of claim 1,
    wherein the inner anti-reflective layer comprises a binder, and
    wherein the binder comprises at least one of silicon, epoxy, acryl, vinyl acetate, a silicon oxide, and an aluminum oxide.

9. The cover window for the display device of claim 1, wherein the coating layer comprises urethane.

10. The cover window for the display device of claim 1, wherein the first film and the second film each comprise at least one of polyimide (PI), polyamide-imide (PAI), polyetheretherketone (PEEK), and polyetherimide (PEI).

11. The cover window for the display device of claim 1, wherein the adhesive layer comprises at least one of ethylene vinyl acetate (EVA), polydimethylsiloxane (PDMS), polyurethane (PU), urethane, acryl, and a silicon-based material.

12. A display device comprising:
    a display panel; and
    a cover window on the display panel,
    wherein the cover window comprises:
        a first film;
        a second film on the first film;
        an adhesive layer between the first film and the second film;
        a coating layer on the second film;
        an inner anti-reflective layer between the first film and the coating layer; and an outer anti-reflective layer on the coating layer, wherein the outer anti-reflective layer is the outermost layer of the cover window.

13. The display device of claim 12, wherein the inner anti-reflective layer comprises at least one of:
a first inner anti-reflective layer between the first film and the adhesive layer;
a second inner anti-reflective layer between the adhesive layer and the second film; and
a third inner anti-reflective layer between the second film and the coating layer.

14. The display device of claim 13,
wherein a refractive index of the first inner anti-reflective layer is between that of the first film and that of the adhesive layer,
wherein a refractive index of the second inner anti-reflective layer is between that of the adhesive layer and that of the second film, and
wherein a refractive index of the third inner anti-reflective layer is between that of the second film and that of the coating layer.

15. The display device of claim 13, wherein refractive indexes of the first inner anti-reflective layer, the second inner anti-reflective layer, and the third inner anti-reflective layer are each in a range of about 1.467 to about 1.667.

16. The display device of claim 13, wherein thicknesses of the first inner anti-reflective layer, the second inner anti-reflective layer, and the third inner anti-reflective layer are each in a range of about 0.1 µm to about 2 µm.

17. The display device of claim 12, wherein a refractive index of the outer anti-reflective layer is between that of the coating layer and that of air.

18. The display device of claim 12, wherein a refractive index of the outer anti-reflective layer is in a range of about 1.200 to about 1.467.

19. A cover window for a display device, comprising:
a first film;
a second film on the first film;
an adhesive layer between the first film and the second film;
a coating layer on the second film; and
an inner anti-reflective layer between the first film and the coating layer,
wherein the coating layer comprises a self-restorable urethane material.

* * * * *